US006904666B2

(12) United States Patent
Alford

(10) Patent No.: US 6,904,666 B2
(45) Date of Patent: Jun. 14, 2005

(54) METHOD OF MANUFACTURING MICROWAVE FILTER COMPONENTS AND MICROWAVE FILTER COMPONENTS FORMED THEREBY

(75) Inventor: James L. Alford, Somerset, NJ (US)

(73) Assignee: Andrew Corporation, Orland Park, IL (US)

( * ) Notice: Subject to any disclaimer, the term of this patent is extended or adjusted under 35 U.S.C. 154(b) by 43 days.

(21) Appl. No.: 10/631,244

(22) Filed: Jul. 31, 2003

(65) Prior Publication Data

US 2005/0030130 A1 Feb. 10, 2005

(51) Int. Cl.[7] .................................................. H01S 4/00
(52) U.S. Cl. .......................... 29/592.1; 29/825; 29/594; 29/595
(58) Field of Search ................................ 29/592.1, 825, 29/600, 594, 595, 830, 25.35; 333/202; 204/192.18

(56) References Cited

U.S. PATENT DOCUMENTS

| | | | | |
|---|---|---|---|---|
| 4,034,319 A | | 7/1977 | Olsson | 333/73 |
| 4,074,214 A | | 2/1978 | Aichholzer | 333/73 |
| 4,278,957 A | | 7/1981 | Starai et al. | 333/202 |
| 4,502,932 A | * | 3/1985 | Kline et al. | 204/192.18 |
| 4,523,162 A | * | 6/1985 | Johnson | 333/202 |
| 4,686,496 A | | 8/1987 | Syrett et al. | 333/202 |
| 4,706,051 A | | 11/1987 | Dieleman et al. | 333/212 |
| 4,791,717 A | | 12/1988 | Hemmie | 29/600 |
| 4,891,615 A | | 1/1990 | Komazaki et al. | 333/206 |
| 5,020,149 A | | 5/1991 | Hemmie | 455/325 |
| 5,103,197 A | | 4/1992 | Turunen et al. | 333/206 |
| 5,175,518 A | | 12/1992 | Swanson, Jr. | 333/168 |
| 5,225,799 A | | 7/1993 | West et al. | 333/202 |
| 5,329,687 A | | 7/1994 | Scott et al. | 29/527.2 |
| 5,389,903 A | | 2/1995 | Piirainen | 333/203 |
| 5,495,215 A | | 2/1996 | Newell et al. | 333/202 |
| 5,682,674 A | * | 11/1997 | Yamazaki et al. | 29/830 |
| 5,731,753 A | | 3/1998 | Block | 333/222 |
| 5,815,900 A | * | 10/1998 | Ichikawa et al. | 29/25.35 |
| 5,874,871 A | | 2/1999 | Didriksen et al. | 333/202 |
| 5,892,419 A | * | 4/1999 | Kotanen et al. | 333/202 |
| 5,990,763 A | | 11/1999 | Sipila | 333/202 |
| 6,255,917 B1 | | 7/2001 | Scott | 333/202 |
| 6,349,454 B1 | * | 2/2002 | Manfra et al. | 29/25.35 |
| 6,462,634 B2 | | 10/2002 | Latouche et al. | 333/202 |
| 6,472,955 B2 | | 10/2002 | Saito et al. | 333/134 |
| 6,839,946 B2 | * | 1/2005 | Ylilammi et al. | 29/25.35 |
| 2002/0045426 A1 | | 4/2002 | Ogi et al. | |
| 2002/0113671 A1 | | 8/2002 | Worth et al. | |
| 2002/0130731 A1 | | 9/2002 | Mansour | |

OTHER PUBLICATIONS

Chappell et al, "Ceramic Synthetic Substrates Using Solid Freeform Fabrication," Mar. 2003, IEEE Transactions of Microwave Theory and Techniques, pp. 752–760.*

* cited by examiner

*Primary Examiner*—Carl J. Arbes
*Assistant Examiner*—Patrick Wamsley
(74) *Attorney, Agent, or Firm*—Wood, Herron & Evans, L.L.P.

(57) ABSTRACT

A simplified method for forming passive microwave components, such as a filter, and passive microwave components formed by the method. The method includes forming a ceramic insert having a plurality of resonator regions and then die casting an outer casing of a conductive material about the ceramic insert. Each resonator region has a cavity that may be filled with the conductive material used to die cast the outer casing or, alternatively, may be filled with a resonator rod made of different materials than the encapsulating metal.

8 Claims, 3 Drawing Sheets

METHOD OF MANUFACTURING MICROWAVE FILTER COMPONENTS AND MICROWAVE FILTER COMPONENTS FORMED THEREBY

FIELD OF THE INVENTION

This invention relates generally to wireless communications networks and similar electronic systems and, in particular, to microwave filter components for wireless communications networks.

BACKGROUND OF THE INVENTION

Wideband, high-data-rate wireless communications networks based on cellular technologies are used worldwide for delivering an ever increasing amount of information to a mobile society. According to fundamental principles of cellular technology, a coverage area is divided into multiple cells that are mutually arranged to communicate with mobile stations or devices with minimal interference. Communications from a mobile station crossing the coverage area is handed-off between adjacent cells according to the location of the mobile station within the coverage area. Each of the cells is generally served by a base station having a transceiver that communicates with the mobile device. The frequency spectrums of the communications signals associated with the cells are divided into multiple different frequency bands. Therefore, filters, such as passive microwave filters, are used to perform band pass and band reject functions for separating the different frequency bands.

Cell sizes are often reduced as information bandwidth handled by the cells increases. As a consequence, additional cells are required within a coverage area to provide wireless communication service to an increasing number of mobile stations. Increasing numbers of passive microwave filters are included in tower-mounted amplifiers and related equipment to address the bandwidth increases.

Conventional microwave filters include a metallic shell or filter body having dividing walls that partition an open interior space into recesses and a cover that closes the recesses to define air-filled filter cavities or resonators. The metalworking process forming the filter body must accommodate precise dimensioning of the recesses to achieve satisfactory filter performance. Typically, the filter body is formed by casting and the cover is formed separately by either casting or stamping. After forming, the filter body may require additional machining for tuning the resonators as desired.

The cover and filter body are assembled together to complete the microwave filter. A seam is defined about the contacting circumferences of the filter body and the cover. After assembly, the cover must have a good electrical contact with the filter body along the entire extent of the seam to ensure proper filter operation. If the microwave filter is exposed to an outdoor environment, the seam must be hermetically sealed against the infiltration of water and other elements so that the resonators remain moisture-free. The presence of moisture in the resonators reduces the long-term reliability of the microwave filter.

Generally, such conventional microwave filters are relatively expensive to manufacture. In particular, the need to manufacture the precisely dimensioned resonators and a separate cover increases the cost as each component must be individually manufactured and assembled together.

The physical size of conventional microwave filters may be reduced by loading inserts of a temperature stable ceramic material characterized by a high dielectric constant and a high quality factor into the recesses previously filled with air. However, despite the reduction in size, the manufacturing cost is not significantly reduced as the microwave filter still includes a filter body and cover, and the ceramic inserts must be loaded into the recesses within the filter body.

Additionally, to address the cost issue, certain microwave filters incorporate commercially-available metallized ceramic resonators into a low-precision, low-cost sheet metal filter body. The presence of the ceramic reduces the size of the microwave filter. However, such composite structures lack the relatively-low insertion losses and relatively-high rejection numbers required for tower-mounted amplifiers currently used in wireless communication networks. Therefore, filter performance suffers.

Therefore, it would be desirable to provide a microwave filter which addresses the problematic seams and cost issues associated with precision formed filters. It would also be desirable to address the performance disadvantages associated with low-cost conventional microwave filters.

DETAILED DESCRIPTION OF THE INVENTION

Figure 1:
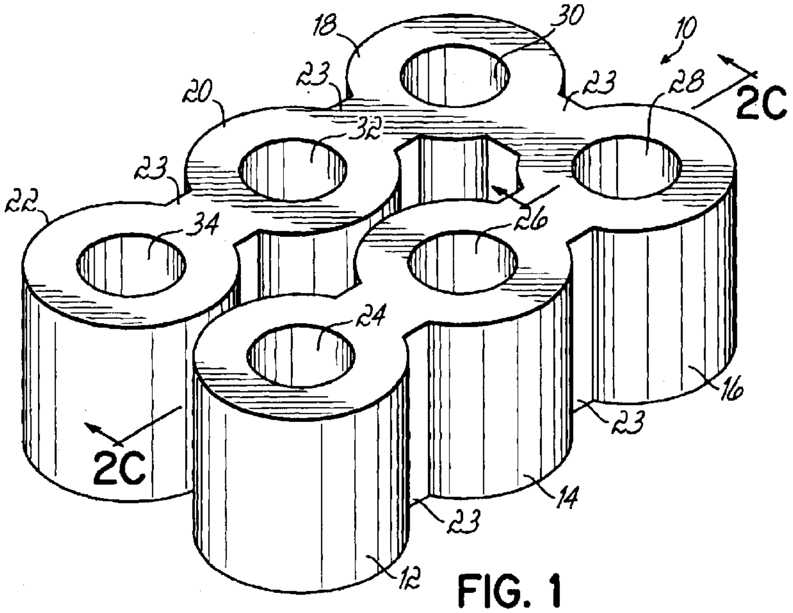
FIG. 1 is a perspective view of a ceramic insert for a microwave filter in accordance with the principles of the invention.

With reference to FIG. 1, a ceramic element or insert 10 is fashioned from a machinable, castable or extrudable ceramic characterized by being easily shaped with standard manufacturing methods, unaffected structurally by high temperatures and high pressures encountered during a die casting process, and a low dissipation factor. An exemplary ceramic material suitable for forming the ceramic insert 10 is boron nitride, which is stable in inert and reducing atmospheres up to about 3000° C. and in oxidizing atmospheres to about 850° C., and is machinable using ordinary machine tools formed of hardened tool steel. Boron nitride has a high thermal conductivity of 20 W/(m–K) at room temperature and an excellent thermal shock resistance exceeding 1500° C. Boron nitride has a dissipation factor (measured according to ASTM D-150) of about 0.0011.

The ceramic insert 10 includes a plurality of annular or tubular resonator regions 12, 14, 16, 18, 20 and 22 and a corresponding plurality of cavities 24, 26, 28, 30, 32 and 34 each surrounded by a corresponding one of the resonator regions 12, 14, 16, 18, 20 and 22. The resonator regions 12, 14, 16, 18, 20 and 22 are electrically connected in series to form a main coupling path for microwave signals through the microwave filter 65 (FIGS. 2D, 3). The electrical response of the microwave filter 65, formed using the ceramic insert 10 as described below, may be altered by varying the proximity of adjacent resonator regions 12, 14, 16, 18, 20 and 22. The number of resonator regions 12, 14, 16, 18, 20 and 22 is not limited, although microwave filter 65 will typically have four to eight distinct resonator regions. The cavities 24, 26, 28, 30, 32 and 34 are aligned parallel to one another and each of the illustrated cavities 24, 26, 28, 30, 32 and 34 has a generally circular cross-sectional profile. However, the invention is not so limited as the cross-sectional profile of the individual cavities 24, 26, 28, 30, 32 and 34 may be, among other examples, elliptical, rectangular or square. The resonator regions 12, 14, 16, 18, 20 and 22 may be dimensioned, shaped, and arranged, as understood by a person of ordinary skill in the art, to provide, for example, a comb-line filter, interdigital filter or a wave guide filter.

The ceramic insert 10 may be a monolithic structure in which the resonator regions 12, 14, 16, 18, 20 and 22 are joined by individual bridging segments 23 of ceramic, as shown in FIG. 1, or may constitute individual components arranged in a side-by-side, contacting relationship after the microwave filter 65 (FIGS. 3A, 3B) is formed. In that latter situation, the individual resonator regions 12, 14, 16, 18, 20 and 22 may include side flats that assist in maintaining the mutual arrangement among the resonator regions 12, 14, 16, 18, 20 and 22 during the die casting process that creates the microwave filter 65. The space between the adjacent pairs of the resonator regions 12, 14, 16, 18, 20 and 22 normally should not be filled by metal during the die casting operation. The bridging segments 23 fill the inter-resonator spaces.

An alternative approach for forming the ceramic insert 10 without the necessity of machining of a ceramic block is ceramic injection molding, which would provide, as an end product, a unitary, monolithic structure of a green ceramic in which the individual resonator regions 12, 14, 16, 18, 20, and 22 are interconnected. A slurry of a ceramic powder and a polymeric binder is injected in an injection molding machine into a mold having a shape complementary to the shape of the ceramic insert 10. The "green" ceramic insert 10 is heated to remove the polymeric binder and then sintered to strengthen the bonds among grains of the ceramic powder.

Figure 2A:
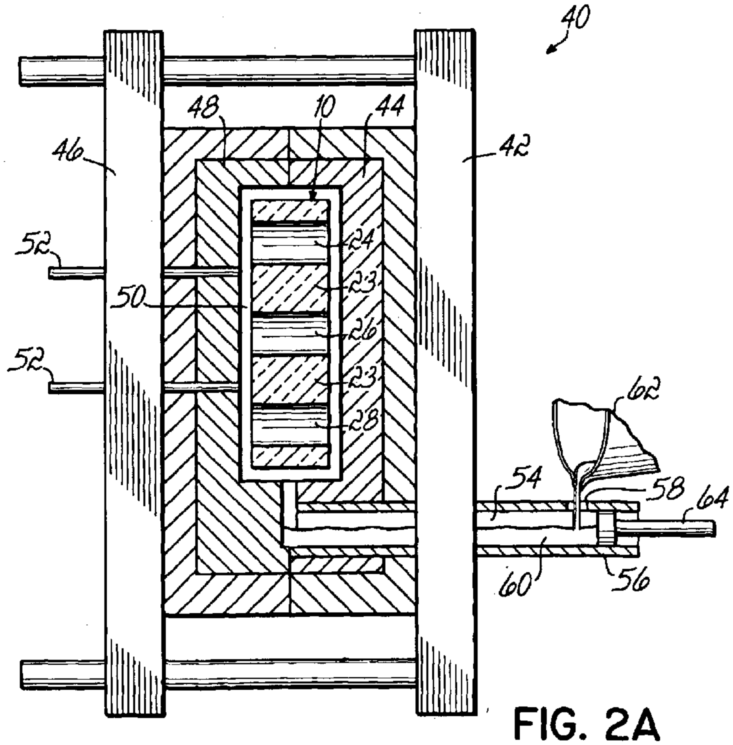
FIGS. 2A–2D are diagrammatic views showing a method for manufacturing the microwave filter of the invention.

With reference to FIG. 2A, a die casting machine, generally indicated by reference numeral 40, includes a stationary platen 42 to which a cover die 44 is attached and a movable platen 46 to which an ejector die 48 is attached. A shaped die cavity 50 is defined between the contacting cover die 44 and ejector die 48. Movement of the movable platen 46 relative to the stationary platen 42 affords access to the die cavity 50. A plurality of ejectors 52 penetrate through the ejector die 48 and are extendable into the die cavity 50 for ejecting the partially-completed microwave filter 65 from the die cavity 50 when the cover die 44 is spaced apart from the ejector die 48.

A metal reservoir 54 is defined in a shot sleeve 56 having one end communicating with the die cavity 50 and an opposite end having an inlet 58 adapted to receive molten metal 60 provided from a metering device 62, such as a ladle. A piston 64 of a hydraulic cylinder extends into the shot sleeve 56. The piston 64 is extendable relative to the shot sleeve 56 for injecting molten metal 60 from the shot sleeve 56 into the die cavity 50.

Figure 2B:
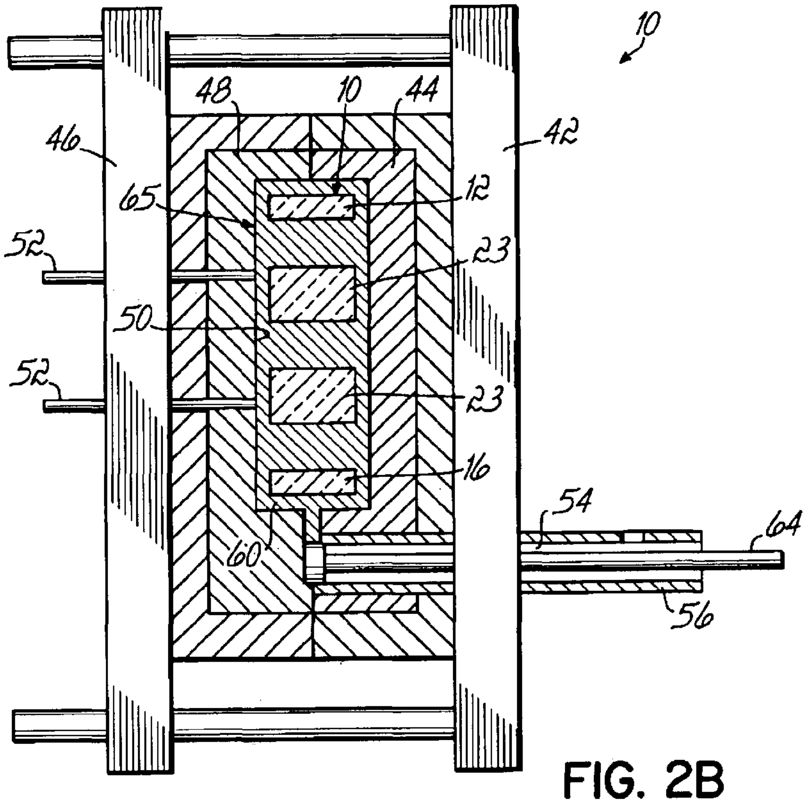
Figure 2C:
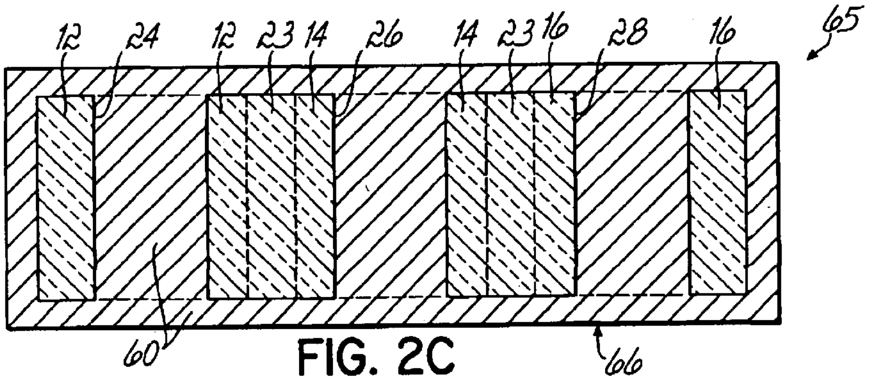
Figure 2D:
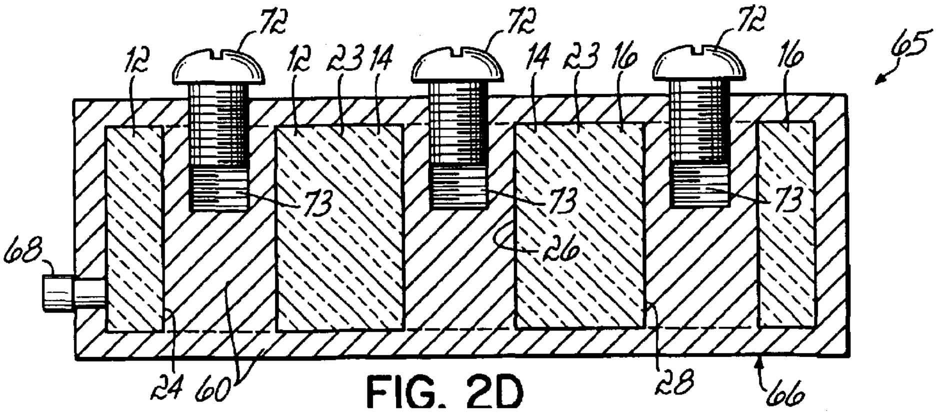
Figure 3:
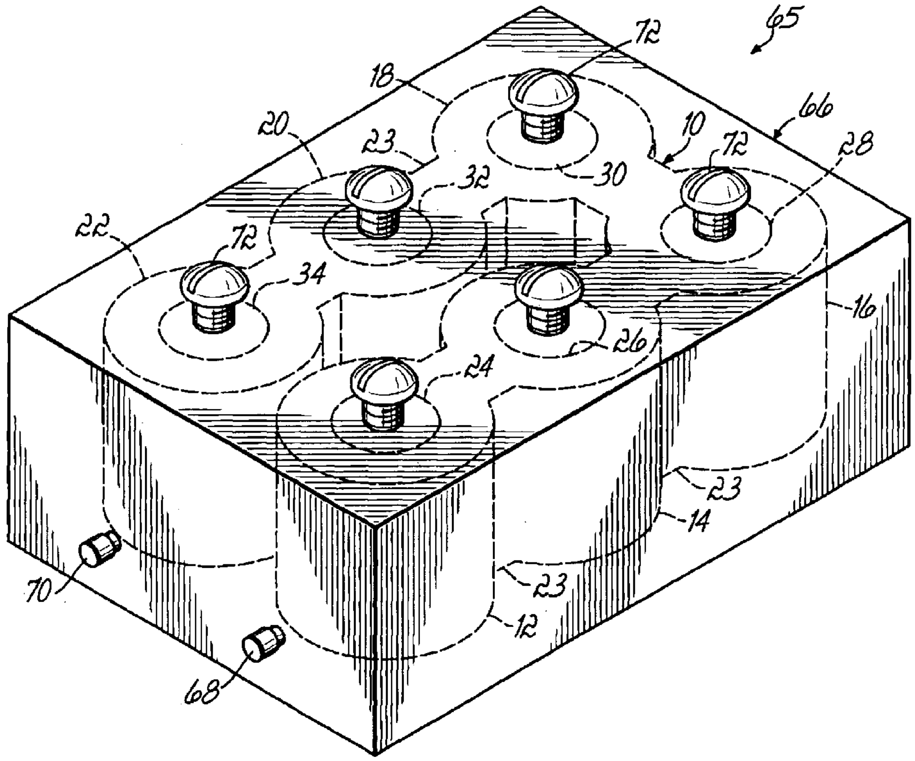
FIG. 3 is a perspective view of the completed microwave filter.

With reference to FIGS. 2A–2D, the manufacture of the microwave filter 65 using the ceramic insert 10 will be described in accordance with the principles of the invention. As described above with reference to FIG. 1, the ceramic insert 10 is formed by either casting, extrusion or injection molding. The movable platen 46 is moved relative to the stationary platen 42 to afford access to the die cavity 50. As shown in FIG. 2A, the ceramic insert 10 is inserted into the die cavity 50 and the movable platen 46 is moved to close the die cavity 50. A metered volume of molten metal 60, typically aluminum or an aluminum alloy, is introduced through the inlet 58 into the reservoir 54 of the shot sleeve 56. As shown in FIG. 2B, the piston 64 is moved within the shot sleeve 56 for introducing the molten metal 60 into the die cavity 50 under high pressure. The molten metal 60 fills the open space within the die cavity 50 not otherwise occupied by the ceramic insert 10, including the resonator regions 12, 14, 16, 18, 20 and 22. After the metal 60 has solidified, the movable platen 46 is moved to again afford access to the die cavity 50 and the ejectors 52 are extended to dislodge and remove a partially-completed microwave filter 65. With reference to FIG. 2C, after solidification, the microwave filter 65 has an elongated outer casing 66 of metal 60 that encapsulates the ceramic insert 10. Metal 60 filling the cavities 24, 26, 28, 30, 32 and 34 of the ceramic insert 10 define individual resonator rods.

With reference to FIGS. 2D and 3, the outer casing 66 may be machined, such as by laser machining or electromachining, to add an input port 68 for introducing an electrical signal into the microwave filter 65 and an output port 70 for extracting a filtered signal. The casing 66 may be further machined to provide threaded openings for tuning adjustment elements 72 that are operative for adjusting the resonant frequency of the cavities 24, 26, 28, 30, 32 and 34 by adjusting the position of each tuning element relative to the metal 60 to change the volume of a corresponding one of a plurality of air gaps 73. Although the tuning adjustment elements 72 are depicted as threaded screws, other types of tuning adjustment elements may be added without deparating from the spirit and scope of the invention. The microwave filter 65 is tuned and tested before being deployed for use.

The microwave filter 65 is a monolithic unit, generally having the shape of a right parallelepiped, that lacks any seams that would otherwise present entry paths for moisture from the surrounding environment. In addition, the absence of a discrete cover and a discrete filter body, as is conventional, eliminates the need to establish a good electrical contact about the entire mutual line-of-contact. A microwave filter in accordance with the principles of the invention is low cost, high performance, seamless and more compact than conventional microwave filters. The microwave filter 65 may be configured as a comb-line filter, interdigital filter or a wave guide filter. The invention contemplates that other passive microwave components may be formed by the method of the invention.

Figure 4:
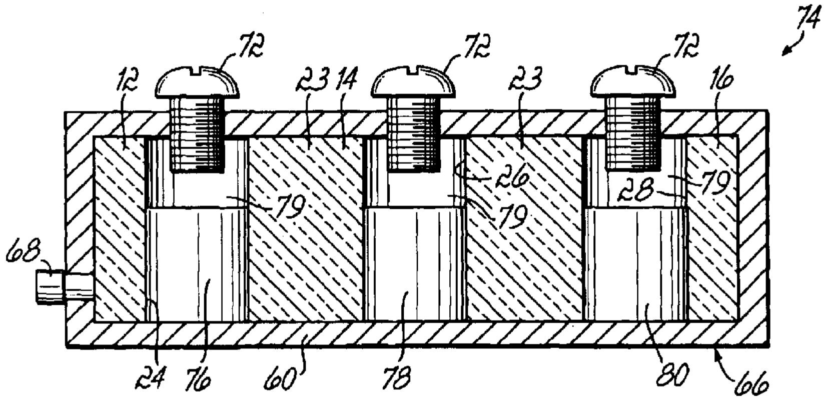
FIG. 4 is a cross-sectional view in accordance with an alternative embodiment of the invention.

With reference to FIG. 4 in which like reference numerals refer to like features in FIG. 2D, a microwave filter 74 may include a plurality of resonator rods 76, 78, and 80, of which only three resonator rods are shown, each filling one of the corresponding cavities 24, 26, and 28 of the dielectric insert 10. In one embodiment, the resonator rods 76, 78, and 80 are shorter than the length of the resonator to create an air gap 79 in the cavities 24, 26, 28, 34. During the molding, appropriate steps may be taken to keep molten metal out of the cavities 24, 26, 28, 34. Resonator rods 76, 78, and 80 are coaxially positioned within the corresponding one of the cavities 24, 26, and 28 and 34 before the ceramic insert 10 is positioned in the die cavity 50 (FIG. 2A) and molten metal 60 is injected into the die cavity 50. The cross-sectional profile of each of the resonator rods 76, 78, and 80 closely matches the cross-sectional profile of the corresponding one of the cavities 24, 26, and 28. The resonator rods 76, 78, and 80 are formed from a metal that differs in composition from the metal 60 injected during the die casting operation (FIGS. 3A, 3B). After the microwave filter 74 is die cast and the metal 60 solidifies, each resonator rod 76, 78, and 80 has a strong metallurgical bond with the inwardly-facing cylindrical sidewall of the corresponding one of the cavities 24, 26, and 28 in the ceramic insert 10. The tuning adjustment elements 72 and the input and output ports 68, 70 are added by machining operations, as described in relation to FIGS. 2C and 2D. Movement of each of the tuning adjustment elements 72 changes the volume of a corresponding one of a plurality of air gaps 79.

While the present invention has been illustrated by a description of various preferred embodiments and while these embodiments have been described in considerable detail in order to describe a preferred mode of practicing the invention, it is not the intention of the applicant to restrict or in any way limit the scope of the appended claims to such detail. Additional advantages and modifications within the spirit and scope of the invention will readily appear to those skilled in the art. The invention itself should only be defined by the appended claims, wherein

What is claimed is:

1. A method of manufacturing a microwave filter comprising:

forming a ceramic insert having a plurality of resonator regions;

placing the ceramic insert inside a die, introducing a molten metal into the die; and allowing the molten metal to solidity so as to encapsulate the ceramic insert.

2. The method of claim 1 wherein each of the plurality of resonator regions includes a cavity, and further comprising:

inserting one of a plurality of resonator rods into each of the cavities.

3. The method of claim 2 wherein each of said plurality of resonator rods is shorter than the corresponding cavity to define an air gap.

4. The method of claim 2 wherein the resonator rod is formed of a first material having a different composition than a second material forming the encapsulating metal.

5. The method of claim 1 wherein each of the plurality of resonator regions has a cavity, and introducing the molten metal further comprises:

allowing the molten metal to fill each cavity thereby forming a corresponding resonator rod.

6. The method of claim 1, further comprising:

machining the solidified metal to add an input port and an output port.

7. The method of claim 1 further comprising:

adding a plurality of tuning adjustment elements each associated with one of the resonator regions.

8. The method of claim 1 wherein the ceramic insert is formed by a manufacturing technique selected from the group consisting of ceramic injection molding, casting and extruding.

* * * * *